United States Patent
Marumo

(10) Patent No.: US 12,216,951 B2
(45) Date of Patent: Feb. 4, 2025

(54) SERVER AND PRINTING SYSTEM

(71) Applicant: SEIKO EPSON CORPORATION, Tokyo (JP)

(72) Inventor: Satoshi Marumo, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/544,700

(22) Filed: Dec. 19, 2023

(65) Prior Publication Data

US 2024/0211192 A1 Jun. 27, 2024

(30) Foreign Application Priority Data

Dec. 22, 2022 (JP) ................................. 2022-205234

(51) Int. Cl.
*G06F 3/12* (2006.01)

(52) U.S. Cl.
CPC ............ *G06F 3/126* (2013.01); *G06F 3/1207* (2013.01); *G06F 3/1259* (2013.01); *G06F 3/1288* (2013.01)

(58) Field of Classification Search
CPC ...... G06F 3/126; G06F 3/1207; G06F 3/1259; G06F 3/1288
See application file for complete search history.

(56) References Cited

U.S. PATENT DOCUMENTS

| | | | |
|---|---|---|---|
| 2008/0187221 A1 | 8/2008 | Konno | |
| 2010/0125492 A1* | 5/2010 | Lin | G06Q 20/3274 705/14.5 |
| 2011/0075191 A1* | 3/2011 | Meunier | H04N 1/00244 358/1.15 |
| 2015/0378657 A1* | 12/2015 | Hagai | G06F 3/1257 358/1.15 |
| 2021/0174283 A1* | 6/2021 | Kurata | G06F 3/1243 |
| 2023/0259982 A1* | 8/2023 | Landers | G06Q 30/0273 705/14.69 |
| 2023/0276005 A1* | 8/2023 | Oshima | H04N 1/00265 358/3.28 |
| 2024/0020066 A1* | 1/2024 | Matsui | G06F 3/1285 |

FOREIGN PATENT DOCUMENTS

JP 2006-178629 A 7/2006
JP 2008-192032 A 8/2008

* cited by examiner

*Primary Examiner* — Iriana Cruz
(74) *Attorney, Agent, or Firm* — WORKMAN NYDEGGER

(57) ABSTRACT

A server connected to a network performs processing of: receiving first information transmitted from a first information terminal connected to the network and transmitting the first information to a second information terminal connected to the network; receiving second information that is information transmitted from the second information terminal and includes the first information, and generating print data based on the second information; and transmitting the print data to a plurality of printing devices connected to the network.

8 Claims, 10 Drawing Sheets

SERVER AND PRINTING SYSTEM

The present application is based on, and claims priority from JP Application Serial Number 2022-205234, filed Dec. 22, 2022, the disclosure of which is hereby incorporated by reference herein in its entirety.

BACKGROUND

1. Technical Field

The present disclosure relates to a server connected to a network. The present disclosure also relates to a printing system.

2. Related Art

A local information transmission system that transmits local information by means of a circular will be described below as an example of known art. JP-A-2006-178629 discloses an example of a local information transmission system. In the local information transmission system described in JP-A-2006-178629, when a circular is created in a local information sending center of a municipality or the like, data for printing out the circular is transmitted from the local information sending center to multifunction machines installed at convenience stores or the like, and the data is stored in the multifunction machine. Further, information indicating that the circular has been created is communicated to a person who circulates the circular, such as a regional leader of a local community.

The regional leader who receives the communication that the circular has been transmitted as data operates a multifunction machine installed in a convenience store or the like near his or her home to print out, acquire, and circulate the circular.

According to such a local information transmission system, it is possible to reduce the costs of printing and delivering the circular incurred by the local information sending center.

The local information sent from the local information sending center is information about a relatively wide area, that is, wide region information and does not include information specific to a local community in which the circular is actually circulated, that is, small region information. In this case, it is necessary for the regional leader of the local community to print the small region information separately from the wide region information, which is troublesome. Further, circulation of printed matter is performed by repeating a procedure in which a household that has received a circular delivers the circular to the next household, and from such a viewpoint as well, it takes time and effort, and information transmission is likely to be delayed.

SUMMARY

In order to solve the above problems, a server of the present disclosure is a server connected to a network, configured to perform processing of receiving first information transmitted from a first information terminal connected to the network and transmitting the first information to a second information terminal connected to the network, receiving second information that is information transmitted from the second information terminal and includes the first information, and generating print data based on the second information, and transmitting the print data to a plurality of printing devices connected to the network.

Also, a printing system of the present disclosure is a printing system including a server connected to a network, a first information terminal connected to the network, a second information terminal connected to the network, and a plurality of printing devices connected to the network, wherein the first information terminal is configured to transmit first information to the server, the server transmits the first information to the second information terminal when the first information is received from the first information terminal, the second information terminal is configured to transmit second information including the first information to the server, and the server generates print data based on the second information and transmits the print data to the plurality of printing devices when the second information is received from the second information terminal.

Also, a printing system of the present disclosure is a printing system including a cloud server connected to a network, a first information terminal that is a terminal connected to the network and belongs to a municipality, a second information terminal that is a terminal connected to the network and owned by a representative of a local community, and a printing device that is connected to the network and owned by a member of the local community, wherein the first information terminal is configured to transmit first information that is wide region information to the cloud server, the cloud server transmits the first information to the second information terminal when the first information is received from the first information terminal, the second information terminal is configured to transmit, to the cloud server, second information obtained by adding small region information to the first information, and the cloud server generates print data based on the second information and transmits the print data to the printing device when the second information is received from the second information terminal.

DESCRIPTION OF EMBODIMENTS

Figure 1:
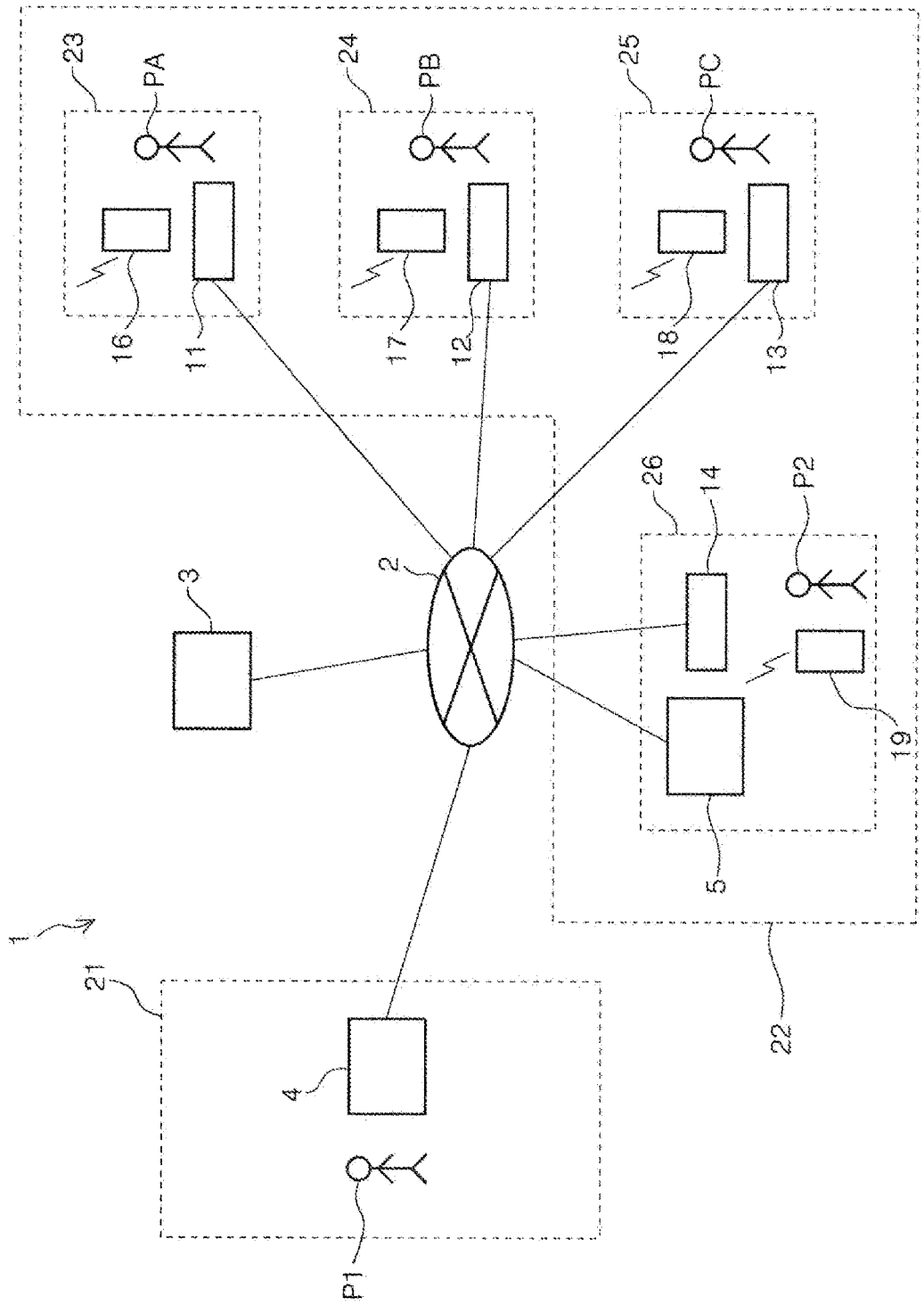
FIG. 1 is a diagram showing a configuration of a printing system.

Hereinafter, the present disclosure will be schematically described.

A server according to a first aspect is a server connected to a network, configured to perform processing of receiving first information transmitted from a first information terminal connected to the network and transmitting the first information to a second information terminal connected to the network, receiving second information that is information transmitted from the second information terminal and includes the first information, and generating print data based on the second information, and transmitting the print data to a plurality of printing devices connected to the network.

According to this aspect, the first information transmitted from the first information terminal is not directly generated as print data and transmitted to the plurality of printing devices, but is transmitted to the second information terminal. For this reason, when the first information is insufficient, information can be added thereto to obtain the second information in the second information terminal, and this second information can be transmitted.

Then, when the second information including the first information is transmitted from the second information terminal, the server generates the print data based thereon and transmits it to the plurality of printing devices.

In this way, it is possible to save the trouble of separately printing out the first information and the information added to the first information. In addition, since the second information is transmitted to the plurality of printing devices, there is no need to circulate one item of printed matter, and thus the trouble of circulating one item of printed matter can be saved, and delays in information transmission can also be inhibited.

A second aspect is an aspect depending from the first aspect, further configured to perform processing of notifying a third information terminal associated with the second information terminal that the first information was transmitted to the server.

According to this aspect, since the server executes the processing of notifying the third information terminal associated with the second information terminal that the first information was transmitted to the server, an owner, an operator, or the like of the second information terminal can ascertain that the first information was transmitted to the server via the third information terminal, and delays in information transmission can be inhibited.

A third aspect is an aspect depending from the second aspect, further configured to perform, along with the processing of transmitting the print data to the plurality of printing devices, processing of notifying a fourth information terminal associated with the printing devices that the print data was transmitted.

According to this aspect, the processing of notifying the fourth information terminal associated with the printing devices that the print data was transmitted is executed along with the processing of transmitting the print data to the plurality of printing devices, and thus, for example, owners, operators, or the like of the printing devices can ascertain that the print data was transmitted from the server via the fourth information terminal. As a result, for example, when the printing devices are not ready, by making the printing devices ready, printing can be performed quickly, and delays in information transmission can be inhibited.

Also, this aspect is not limited to the second aspect and may depend from the first aspect.

A fourth aspect is an aspect depending from the third aspect, further configured to perform processing of acquiring a status of the printing devices and transmitting information relating to the status to at least one of the second information terminal and the third information terminal.

According to this aspect, the server acquires the status of the printing devices and executes the processing of transmitting the information relating to the status to at least one of the second information terminal and the third information terminal. Thus, the owner, operator, or the like of the second information terminal can understand whether or not correct printing out was performed, whether or not an error such as running out of consumables has occurred, or the like in the printing devices. As a result, the owner, operator, or the like of the second information terminal can go to the owners, operators, or the like of the printing devices to try to eliminate the error or the like, thereby improving certainty of information transmission.

Also, this aspect is not limited to the third aspect and may depend from the second aspect.

A fifth aspect is an aspect depending from the fourth aspect, configured to provide a user interface for inputting and transmitting, to the fourth information terminal, information indicating that printed matter output from the printing devices was confirmed, and to provide information relating to the confirmation to at least one of the second information terminal and the third information terminal.

According to this aspect, the owners, operators, or the like of the printing devices can transmit information indicating that the printed matter was confirmed to the server via the fourth information terminal. In addition, since the server can provide the information relating to the confirmation to at least one of the second information terminal and the third information terminal, the owner, operator, or the like of the second information terminal can understand a status of information transmission, and reliability of the information transmission can be improved.

Also, this aspect is not limited to the above fourth aspect, and may also depend from the above third aspect.

A sixth aspect is an aspect depending from any one of the first to fifth aspects, wherein the print data is transmitted to the plurality of printing devices at a specified timing via the second information terminal.

According to this aspect, since the print data is transmitted to the plurality of printing devices at the specified timing via the second information terminal, it is possible to obtain a degree of freedom in the timing of printing the second information. For example, if the print data is transmitted to the plurality of printing devices in a time period in the evening, the fact that the second information was printed from the printing devices is likely to be noticed.

A printing system according to a seventh aspect Is a printing system including a server connected to a network, a first information terminal connected to the network, a second information terminal connected to the network, and a plurality of printing devices connected to the network, wherein the first information terminal is configured to transmit first information to the server, the server transmits the first information to the second information terminal when the first information is received from the first information terminal, the second information terminal is configured to transmit second information including the first information to the server, and the server generates print data based on the second information and transmits the print data to the plurality of printing devices when the second information is received from the second information terminal.

According to this aspect, the first information transmitted from the first information terminal is not directly generated as the print data and transmitted to the plurality of printing devices, but is transmitted to the second information terminal. For this reason, when the first information is insufficient, information can be added thereto to obtain the second information in the second information terminal, and this second information can be transmitted.

Then, when the second information including the first information is transmitted from the second information terminal, the server generates the print data based thereon and transmits it to the plurality of printing devices.

In this way, the trouble of separately printing out the first information and the information added to the first information can be saved. In addition, since the second information is transmitted to the plurality of printing devices, there is no need to circulate one item of printed matter, and thus the trouble of circulating one item of printed matter can be saved, and delays in information transmission can also be inhibited.

A printing system according to an eighth aspect is a printing system including a cloud server connected to a network, a first information terminal that is a terminal connected to the network and belongs to a municipality, a second information terminal that is a terminal connected to the network and owned by a representative of a local community, and a printing device that is connected to the network and owned by a member of the local community, wherein the first information terminal is configured to transmit first information that is wide region information to the cloud server, the cloud server transmits the first information to the second information terminal when the first information is received from the first information terminal, the second information terminal is configured to transmit, to the cloud server, second information obtained by adding small region information to the first information, and the cloud server generates print data based on the second information and transmits the print data to the printing device when the second information is received from the second information terminal.

According to this aspect, the first information transmitted from the first information terminal, that is, the wide region information, is not directly generated as the print data and transmitted to the printing device owned by the member of the local community, but is transmitted to the second information terminal owned by the representative of the local community.

In addition, when the second information obtained by adding the small region information to the first information, that is, the wide region information, is transmitted from the second information terminal, the cloud server generates the print data based thereon and transmits it to the printing device.

In this way, the trouble of separately printing out the wide region information and the small region information performed by the representative of the local community can be saved. In addition, since the second information is transmitted to the plurality of printing devices, there is no need to circulate one item of printed matter, and thus the trouble of circulating one item of printed matter can be saved, and delays in information transmission can also be inhibited.

The present disclosure will be specifically described below.

FIG. 1 shows a system configuration of a printing system 1 according to one embodiment of the present disclosure, in which each device can communicate with each other via the Internet 2 serving as an example of a network.

In this embodiment, a case will be described as an example in which the printing system 1 provides a means to replace circulation of a circular in a local community. However, the printing system 1 according to the present disclosure is not limited to such a form.

Reference numeral 3 denotes a server capable of transmitting and receiving information via the Internet 2. In this embodiment, the server 3 is a cloud server that provides a cloud service. However, the server 3 is not limited thereto.

Reference numeral 21 denotes a government building of a municipality (for example, a city office), and it is assumed that a first transmitter P1 uses a first information terminal 4 to transmit first information in the government building 21 The first transmitter P1 is, for example, a member of a municipality. The first information terminal 4 is, for example, a personal computer. The first information is, for example, information sent by the municipality to residents in the local community, and is, for example, wide region information.

Reference numerals 23, 24, 25, and 26 denote residences of the residents belonging to the municipality, which belong to a local community 22. Here, the "local community" May be read as the residents' association, a neighborhood association, or the like. Members PA, PB, and PC reside in residences 23, 24, and 25, respectively, and a second transmitter P2 resides in a residence 26. The second transmitter P2 is a member and representative of the local community 22. Here, the "second transmitter" May be read as a leader of the residents' association, a leader of the neighborhood association, a regional leader, or the like.

At least a printing device is installed in each residence, and the installed printing device is connected to the Internet 2. Reference numerals 11, 12, 13, and 14 denote printing devices installed in the residences 23, 24, 25, and 26, respectively. Also, the second transmitter P2 is not necessarily required to have the printing device 14 because the second transmitter P2 can access second information, which will be described later. Hereinafter, when there is no need to distinguish the printing devices 11, 12, 13, and 14 from one another, they may be collectively referred to as "each printing device."

Each printing device is, for example, an ink jet printer capable of performing ink jet recording on a medium represented by recording paper.

Also, the members PA, PB, and PC and the second transmitter P2 have portable information terminals. The member PA owns a portable information terminal 16, the member PB owns a portable information terminal 17, the member PC owns a portable information terminal 18, and the second transmitter P2 owns a portable information terminal 19. Each portable information terminal is, for example, a smartphone and can be connected to the Internet 2 via a wireless LAN or a mobile communication network. The portable information terminals 16, 17, and 18 respectively carried by the members PA, PB, and PC are examples of a fourth information terminal associated with each printing device. In addition, the portable information terminal 19 carried by the second transmitter P2 is an example of a third information terminal associated with a second information terminal 5.

Figure 2:
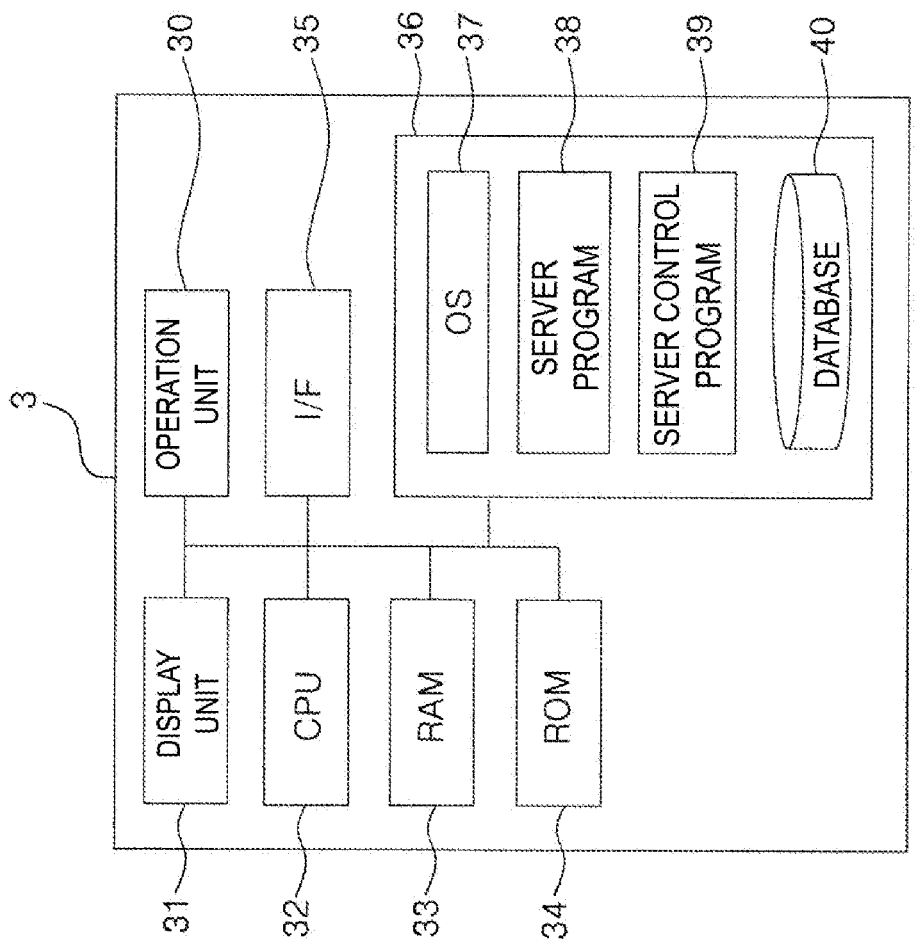
FIG. 2 is a block diagram showing a configuration of a server.

Next, a configuration of the server 3 will be described with reference to FIG. 2.

The server 3 includes an operation unit 30, a display unit 31, a CPU 32, a RAM 33, a ROM 34, a storage 36, and an interface (hereinafter referred to as "I/F") 35.

The storage 36 is configured by a hard disk drive (HDD), a solid state drive (SSD), or the like. The storage 36 stores various programs such as an operating system (hereinafter referred to as "OS") 37, a server program 38, and a server control program 39, and various kinds of data such as a database 40.

The server program 38 is a program that operates under the OS 37 and is a program for the server 3 to function as a cloud server. The server control program 39 is a program that operates under the OS 37, is a program for performing various processing performed by the server 3, which will be described later, and includes a program for providing a cloud service.

The database 40 stores the first information and the second information, which will be described later, information such as device information and addresses of each printing device for transmitting print data to the printing devices 11, 12, 13, and 14, information such as addresses for transmitting various kinds of information to the portable information terminals 16, 17, 18, and 19, authentication information for using cloud services from each terminal, and the like.

The CPU 32 loads various programs and the like stored in the ROM 34 or the storage 36 into the RAM 33, which is a volatile memory, and executes the programs.

The operation unit 30 is configured of a keyboard and a pointing device such as a mouse or a touch pad.

The display unit 31 is configured by a liquid crystal display or the like. Various user interfaces are generated on the display unit 31 by the OS 37, the server control program 39, and the like. Also, in the following, the term user interface is abbreviated as "UI."

The I/F 35 is a communication interface for connecting the server 3 to the Internet 2.

Figure 3:
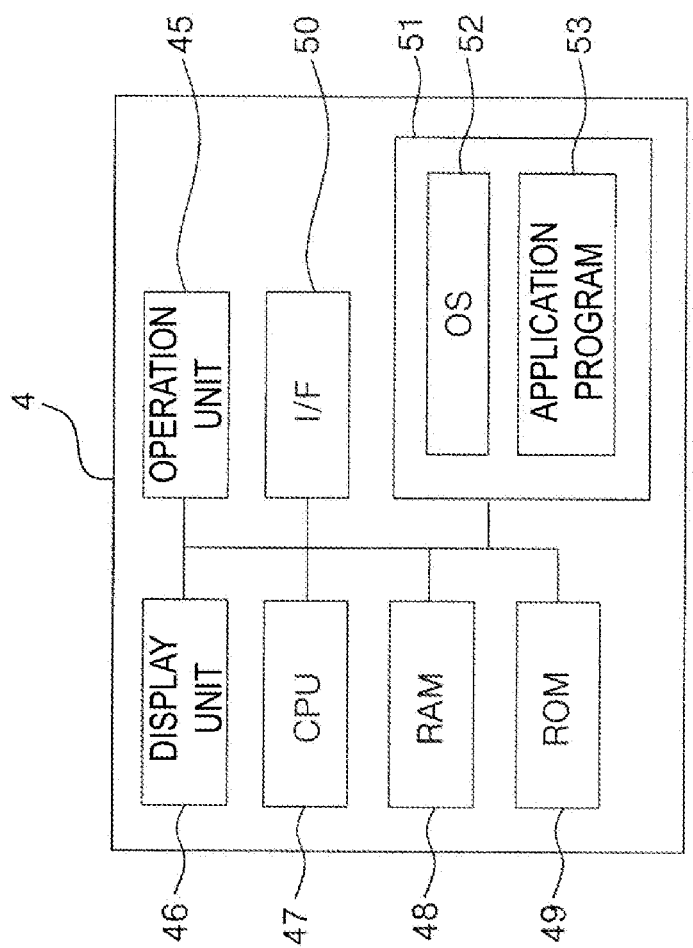
FIG. 3 is a block diagram showing a configuration of a first information terminal.

Next, a configuration of the first information terminal 4 will be described with reference to FIG. 3.

The first information terminal 4 includes an operation unit 45, a display unit 46, a CPU 47, a RAM 48, a ROM 49, a storage 51, and an I/F 50.

The storage 51 is configured of a hard disk drive (HDD), a solid state drive (SSD), or the like. The storage 51 stores various programs such as an OS 52 and an application program 53, and various kinds of data.

The application program 53 is a program that operates under the OS 52 and includes a web browser. The cloud service provided by the server 3 can be used via a web browser.

The CPU 47 loads various programs and the like stored in the ROM 49 or the storage 51 into the RAM 48, which is a volatile memory, and executes the programs.

The operation unit 45 includes a keyboard and a pointing device such as a mouse or a touch pad.

The display unit 46 is configured by a liquid crystal display or the like. On the display unit 46, various UIs are generated by the OS 52, the application program 53, and the like.

The I/F 50 is a communication interface for connecting the first information terminal 4 to the Internet 2.

In addition, the second information terminal 5 also has the same configuration as that of the first information terminal 4 described above, and repeated description thereof will be avoided here.

Figure 4:
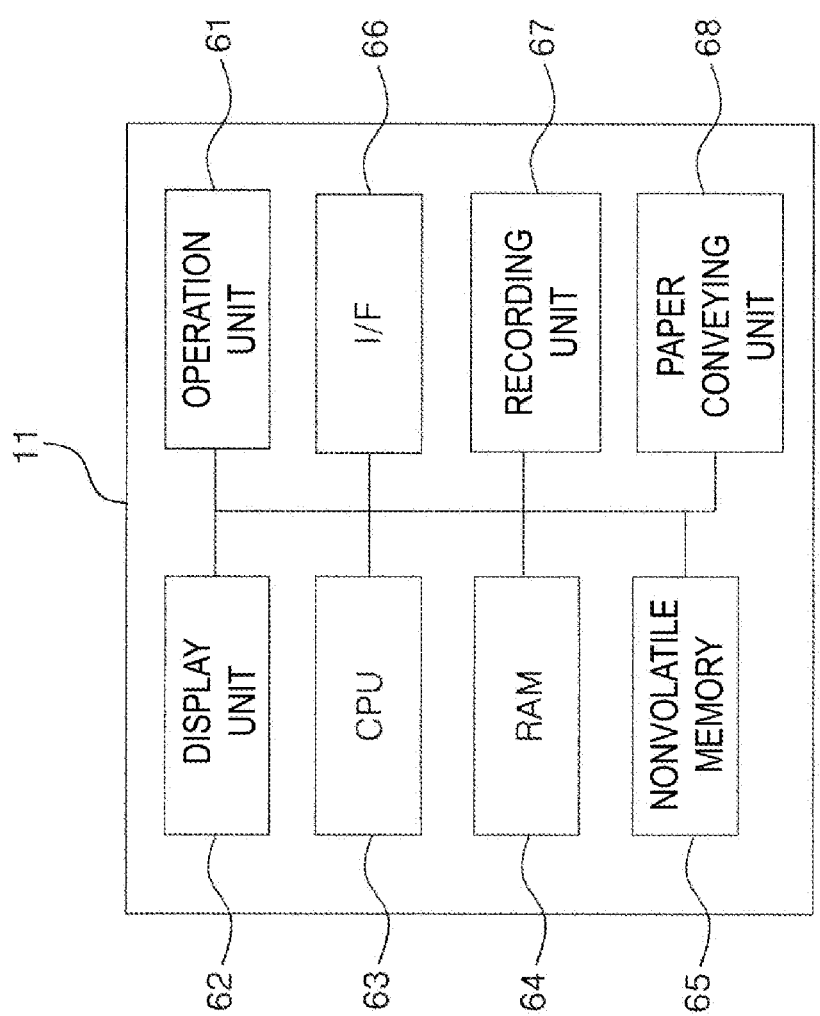
FIG. 4 is a block diagram showing a configuration of a printing device.

Next, a configuration of the printing device 11 will be described with reference to FIG. 4.

The printing device 11 includes an operation unit 61, a display unit 62, a CPU 63, a RAM 64, a nonvolatile memory 65, an I/F 66, a recording unit 67, and a paper conveying unit 68. The CPU 63 loads various control programs and the like stored in the nonvolatile memory 65 into the RAM 64, which is a volatile memory, and executes the programs.

The operation unit 61 includes a power button, ten keys, a cross button, an enter button, a return button, and the like (not shown).

The display unit 62 is configured by a liquid crystal display or the like. Various UIs are displayed on the display unit 62.

The I/F 66 includes a communication interface for connecting the printing device 11 to the Internet 2.

The recording unit 67 is configured of an ink jet recording head (not shown). The paper conveying unit 68 includes a paper conveying roller (not shown) and the like.

In addition, other printing devices 12, 13, and 14 also have the same configuration as that of the printing device 11 described above, and repeated description thereof will be omitted here.

Figure 5:
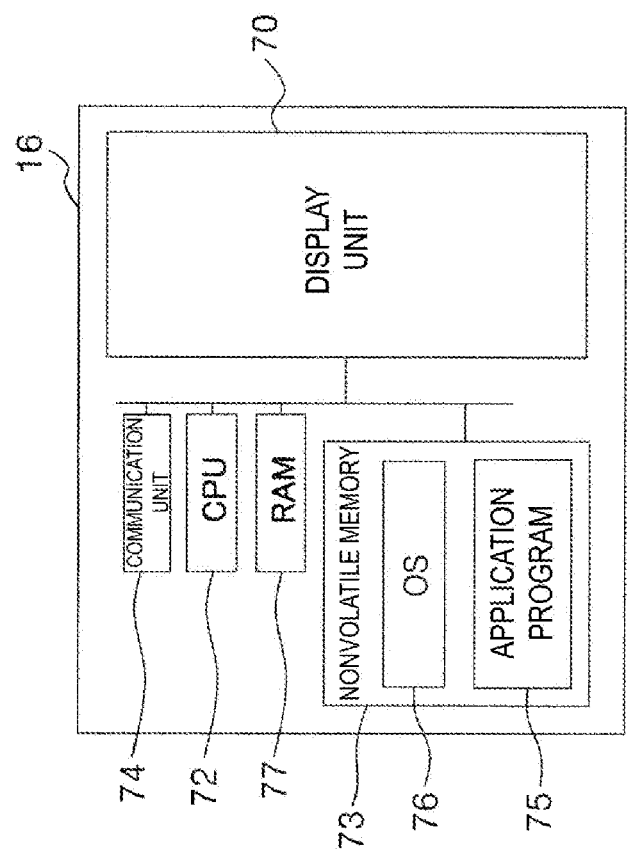
FIG. 5 is a block diagram showing a configuration of a portable information terminal.

Next, a configuration of the portable information terminal 16 will be described with reference to FIG. 5.

The portable information terminal 16 includes a display unit 70, a communication unit 74, a CPU 72, a RAM 77, and a nonvolatile memory 73.

The display unit 70 is configured by, for example, a touch panel to display various kinds of information and realizes a UI for accepting various setting operations performed by a user. The user performs various setting operations and execution operations in accordance with the UI displayed on the display unit 70.

The nonvolatile memory 73 stores various programs such as an OS 76 and an application program 75, and various kinds of data.

The application program 75 is a program that operates under the OS 76 and includes a web browser. The cloud service provided by the server 3 can be used via a web browser.

The CPU 72 loads various programs and the like stored in the nonvolatile memory 73 into the RAM 77, which is a volatile memory, and executes the programs.

The communication unit 74 includes a communication module for wireless Wi-Fi communication, in addition to a communication module for mobile communication.

In addition, other portable information terminals 17, 18, and 19 also have the same configuration as that of the portable information terminal 16 described above, and repeated description thereof will be avoided here.

Next, with reference to FIG. 6, a flow of processing mainly performed by the server 3 will be described by combining user operations and processing performed by other devices.

In the government building 21, the first transmitter P1 creates the first information of which the municipality informs residents using the first information terminal 4 (step S1), and then transmits the first information to the server 3, that is, the cloud service (step S2). As described above, the first information is, for example, wide region information and is information that is preferably notified to all members of the municipality. Transmission destination candidates of the first information are registered in advance, and the first transmitter P1 can select transmission destinations of the first information on the cloud service. In this embodiment, it is assumed that the transmission destinations of the first information include the second transmitter P2.

The server 3 holds the received first information and then transmits information indicating that the first information has been transmitted onto the cloud to the portable information terminal 19 owned by the second transmitter P2 belonging to the local community 22 (step S3). The second transmitter P2 who receives this requests the server 3, that is, the cloud service, via the second information terminal 5 to send data of the first information (step S4). In response to this, the server 3 transmits the first information to the second information terminal 5 (step S5).

Since the first information is wide region information, the second transmitter P2 adds small region information, for example, information specific to the local community 22, to the first information to create the second information (step S6). Also, the second information is not limited to the first information to which other information is added, and may be the first information itself.

Then, the second transmitter P2 transmits the second information to the server 3, that is, the cloud service, via the second information terminal 5 (step S7). The transmission of the second information can be performed via a UI (not shown) provided by the cloud service. Also, in this UI (not shown), the second transmitter P2 may be allowed to select whether or not all the members of the local community 22 or any member of the local community 22 is to be the transmission destination of print data, which will be described later.

The server 3 that has received the second information generates print data (step S8). Also, the server 3 has device information of each printing device and a printer driver suitable for each printing device, and the print data is data suitable for each printing device.

Next, the server 3 transmits the generated print data to each printing device (step S9). Further, the server 3 transmits information indicating that the print data has been transmitted to each of the portable information terminals (step S10). Also, the transmission of the print data to the printing device 14 owned by the second transmitter P2 (step S9) and the notification to the portable information terminal 19 (step S10) may be omitted.

Figure 7:
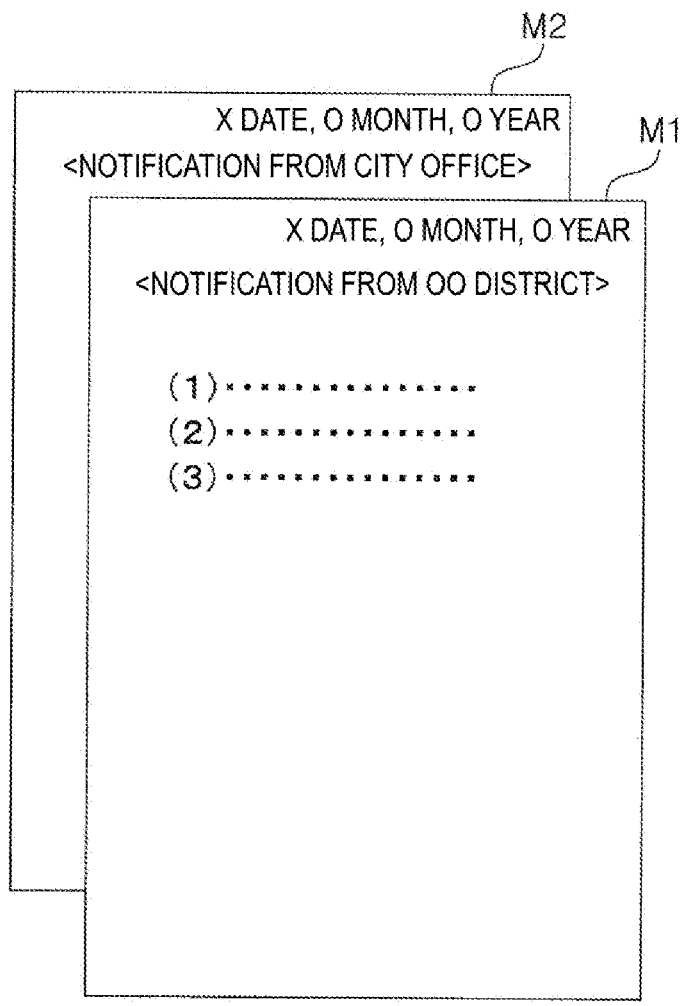
FIG. 7 is a diagram showing an example of printed matter on which second information is printed out.

Each printing device that has received the print data performs printing (step S11). Thus, for example, printed matters M1 and M2 as shown in FIG. 7 are printed. The printed matter M2 indicates the content of the first information, that is, the wide region information, and the printed matter M1 indicates the content of the information added to the first information, that is, the small region information.

Figure 8:
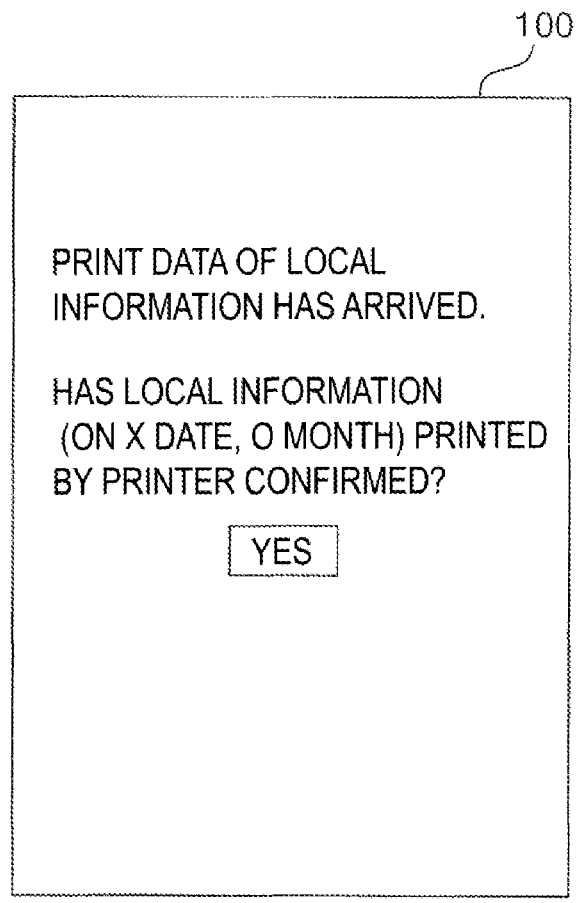
FIG. 8 is a diagram showing one example of a UI displayed on the portable information terminal.

Returning to FIG. 6, each printing device notifies the server 3 of status information indicating whether or not printing has been performed and a device state thereof (step S12). The status information includes, for example, information regarding an amount of remaining ink, a paper jam, and the like The notification of transmission in step S10 is displayed on the portable information terminals 19, 17, and 18 owned by the respective members PA, PB, and PC using a UI 100 as shown in FIG. 8, for example.

Figure 6:
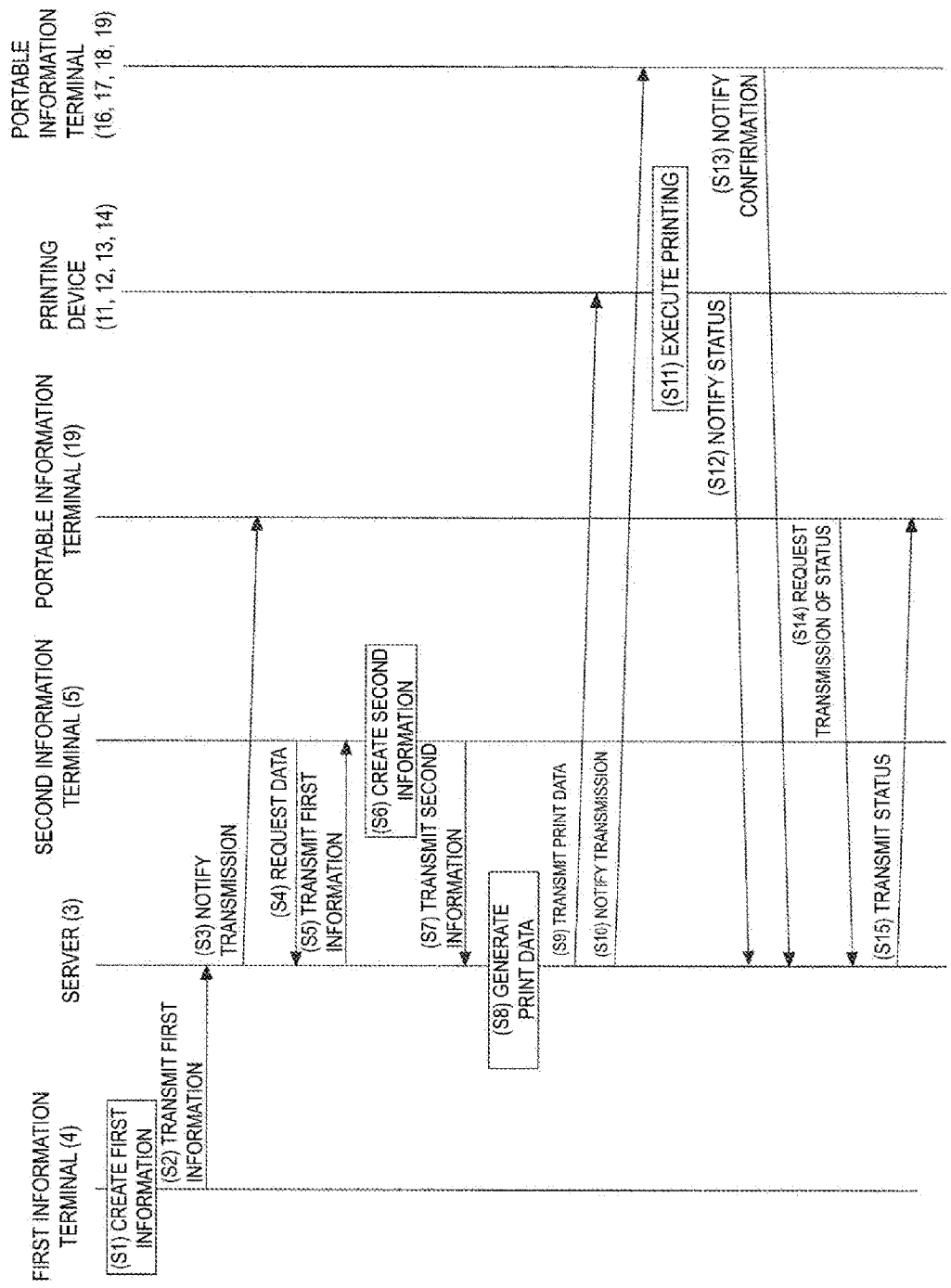
FIG. 6 is a sequence diagram showing a relationship between processing performed by a server, operations of a user, and processing performed by other devices.

When each member presses "YES" in the displayed UI 100, each portable information terminal notifies the server 3 of that information, as shown in step S13 in FIG. 6.

When the second transmitter P2 who is the representative of the local community 22 makes a status transmission request to the server 3 via his or her portable information terminal 19 (step S14), the server 3 transmits the status to the portable information terminal S19 in response to this request (step S15).

Figure 9:
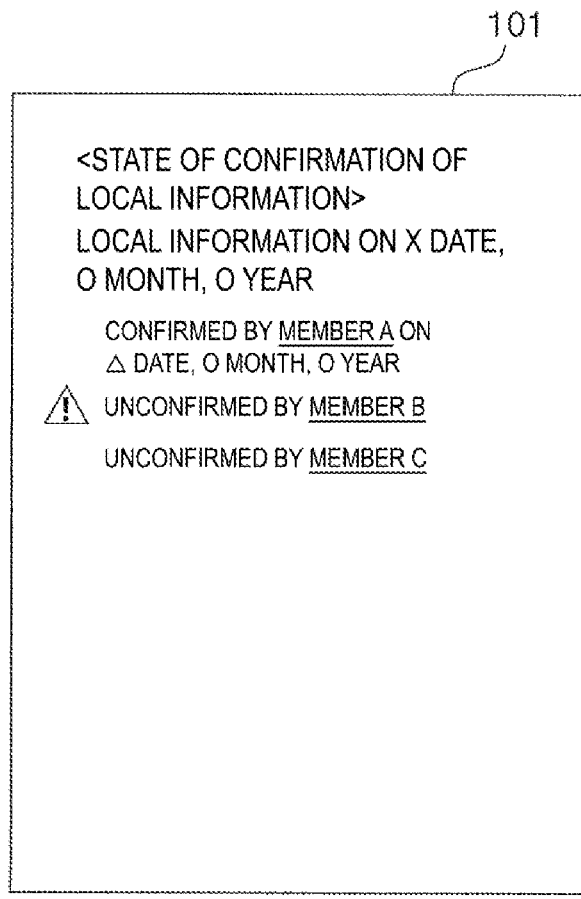
FIG. 9 is a diagram showing one example of the UI displayed on the portable information terminal.

A UI 101 of FIG. 9 shows an example of the UI displayed on the portable information terminal 19 based on step S15, and as illustrated, along with information (date) identifying the transmitted print data, that is, the second information, a status of confirmation of the printed matter performed by each member is indicated by either "confirmed" or "unconfirmed."Also, in the case of "confirmed," the confirmed date is indicated.

Figure 10:
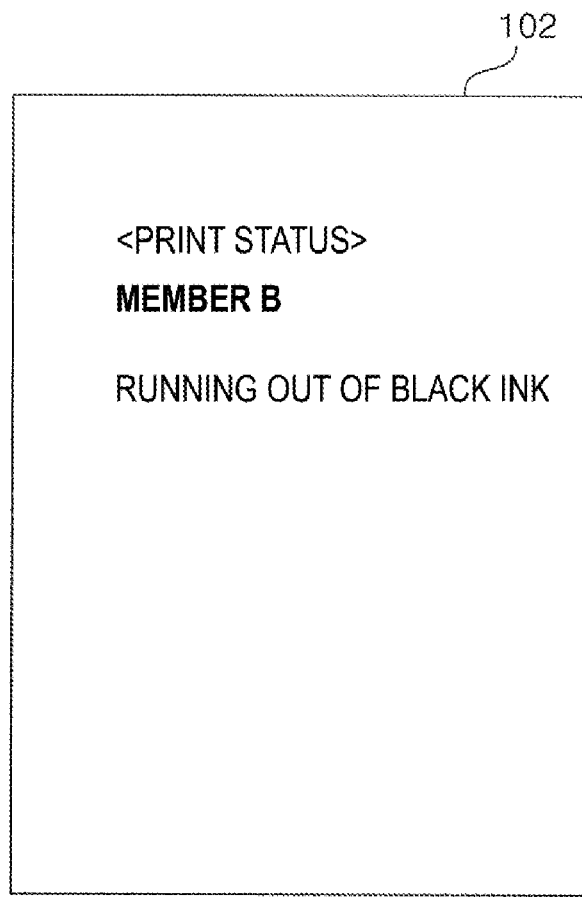
FIG. 10 is a diagram showing one example of the UI displayed on the portable information terminal.

A link is given to each member's name, and when each member's name is tapped, a UI 102 as shown in FIG. 10 is displayed. The UI 102 indicates a status of the printing device owned by each member, and the second transmitter P2 can understand the reason from the UI 102 particularly when each member does not confirm the printed matter. In addition, when a power supply of the printing device owned by each member is turned off and the status of the printing device cannot be acquired, that information is displayed on the UI 102.

Further, as shown in FIG. 10, if there is some problem in the printing device, for example, ink shortage or paper jam, a warning mark is displayed for the member's name.

Also, by setting via the first information terminal 4 or the second information terminal 5, the server 3 that has received the first information in step S2 of FIG. 6 May immediately generate the print data based thereon and transmit the print data to each printing device.

Also, the processing of steps S10, S12, S13, S14, and S15 in FIG. 6 May be omitted as appropriate.

As described above, the server 3 connected to the Internet 2 performs processing of receiving the first information transmitted from the first information terminal 4 connected to the Internet 2 and transmitting the first information to the second information terminal 5 connected to the Internet 2 (step S5 in FIG. 6), processing of receiving the second information that is information transmitted from the second information terminal 5 and includes the first information and generating the print data based on the second information (step S8 in FIG. 6), and processing of transmitting the print data to the plurality of printing devices connected to the Internet 2 (step S9 in FIG. 6).

That is, the first information transmitted from the first information terminal 4 is not directly generated as the print data and transmitted to the plurality of printing devices, but is transmitted to the second information terminal 5. For this reason, when the first information is insufficient, information can be added thereto to obtain the second information in the second information terminal 5 and transmit the second information.

Then, when the second information including the first information is transmitted from the second information terminal 5, the server 3 generates the print data based thereon and transmits the print data to the plurality of printing device.

In this way, the second transmitter P2 who is the representative of the local community 22 can save the trouble of separately printing out the first information and the information added to the first information. In addition, since the second information is transmitted to the printing device of each member and printed, there is no need to circulate one item of printed matter, and thus the trouble of circulating one item of printed matter can be saved, and delays in information transmission can be inhibited.

Also, the server 3 performs processing of notifying the portable information terminal 19, which is the third information terminal associated with the second information terminal 5, that the first information has been transmitted (step S3 in FIG. 6). Thus, via the portable information terminal 19, the second transmitter P2 can ascertain that the first information has been transmitted to the server 3, and delays in information transmission can be inhibited.

Also, along with the processing of transmitting the print-data to the plurality of printing devices (step S9 in FIG. 6), the server 3 performs processing of notifying the portable information terminals 16, 17, 18, and 19, which are the fourth information terminals associated with each printing device, that the print data has been transmitted (step S10 in FIG. 6). Thus, the members PA, PB, and PC who are owners of each printing device can ascertain that the print data has been transmitted from the server 3. As a result, when the owned printing device is not ready, by making the printing device ready, printing can be performed quickly, and delays in information transmission can be inhibited.

Also, the server 3 acquires the status of each printing device and transmits information relating to the status to the portable information terminal 19 associated with the second transmitter P2 (step S15 in FIG. 6). Thus, the second transmitter P2 can understand whether or not the printing has been correctly performed in each printing device, whether or not an error such as running out of consumables has occurred in each printing device, and the like. As a result, the second transmitter P2 can go to the residence of the relevant member and try to solve the error or the like, and thus reliability of the information transmission can be improved. In particular, it is more preferable when the relevant member is unfamiliar with operations of the printing device or the like.

Also, in this embodiment, the information relating to the status of each printing device is transmitted to the portable information terminal 19, but it may also be transmitted to the second information terminal 5.

Also, the server 3 can provide the UI 100 (see FIG. 8) for inputting and transmitting information indicating that the output printed matter has been confirmed to the portable information terminals 16, 17, and 18, and can further provide information relating to the confirmation to the portable information terminal 19 (step S15 in FIG. 6). Thus, the second transmitter P2 can understand a state of the information transmission, and reliability of the information transmission can be improved.

Also, a sensor (not shown) may be provided on a paper discharge tray of each printing device to detect that the printed matter has been removed from the paper discharge tray, and the detection result may be transmitted to the server 3. Further, the information relating to the detection result may be transmitted to the portable information terminal 19 of the second transmitter P2.

It is also preferable to enable transmission of the print data from the server 3 to each printing device (step S9 in FIG. 6) at a specified timing via the second information terminal 5. Thus, it is possible to obtain a degree of freedom in the timing of printing in each printing device. For example, if the server 3 transmits the print data to each printing device in a time period in the evening, the fact that the second information has been printed from each printing device is likely to be noticed.

It is needless to say that the present disclosure is not limited to the embodiments and modified examples described above, and various modifications are possible within the scope of the disclosure described in the appended claims, and they are also included in the scope of the present disclosure.

For example, in the above embodiments, a case in which the printing system 1 provides a means to replace circulation of a circular in a residential region has been described, but the present disclosure is not limited thereto, and the printing system 1 can also provide a means to replace circulation of a circular in a workplace, for example.

What is claimed is:

1. A server connected to a network, configured to perform processing of:
    receiving first information that is wide region information and transmitted from a first information terminal, which is connected to the network and belongs to a municipality, and transmitting the first information to a second information terminal, which is connected to the network and owned by a representative of a local community;
    receiving second information that is information transmitted from the second information terminal and is obtained by adding small region information to the first information;
    generating print data based on the second information; and
    transmitting the print data to a plurality of printing devices, which are connected to the network and owned by members of the local community.

2. The server according to claim 1, further configured to perform processing of notifying a third information terminal associated with the second information terminal that the first information was transmitted to the server.

3. The server according to claim 2, further configured to perform, along with the processing of transmitting the print data to the plurality of printing devices, processing of notifying a fourth information terminal associated with the printing devices that the print data was transmitted.

4. The server according to claim 3, further configured to perform processing of acquiring a status of the printing devices and transmitting information relating to the status to at least one of the second information terminal and the third information terminal.

5. The server according to claim 4, configured to provide a user interface for inputting and transmitting, to the fourth information terminal, information indicating that printed matter output from the printing devices was confirmed, and to provide information relating to the confirmation to at least one of the second information terminal and the third information terminal.

6. The server according to claim 1, wherein the print data is transmitted to the plurality of printing devices at a specified timing via the second information terminal.

7. A printing system comprising:
    a server connected to a network;
    a first information terminal connected to the network and belonging to a municipality;
    a second information terminal connected to the network and owned by representative of a local community; and
    a plurality of printing devices connected to the network and owned by members of the local community, wherein
    the first information terminal is configured to transmit first information to the server, the server transmits the first information to the second information terminal when the first information that is wide region information is received from the first information terminal,
    the second information terminal is configured to transmit second information, which is obtained by adding small region information to the first information, to the server, and
    the server generates print data based on the second information and transmits the print data to the plurality of printing devices when the second information is received from the second information terminal.

8. A printing system comprising:
    a cloud server connected to a network;
    a first information terminal that is a terminal connected to the network and belongs to a municipality;
    a second information terminal that is a terminal connected to the network and owned by a representative of a local community; and
    a printing device that is connected to the network and owned by a member of the local community, wherein
    the first information terminal is configured to transmit first information that is wide region information to the cloud server, the cloud server transmits the first information to the second information terminal when the first information is received from the first information terminal, the second information terminal is configured to transmit, to the cloud server, second information obtained by adding small region information to the first information, and the cloud server generates print data based on the second information and transmits the print data to the printing device when the second information is received from the second information terminal.

\* \* \* \* \*